United States Patent
Hale et al.

(10) Patent No.: US 6,721,274 B2
(45) Date of Patent: Apr. 13, 2004

(54) CONTROLLING PACKET FLOW THROUGH A STACK USING SERVICE RECORDS

(75) Inventors: Douglas LaVell Hale, Orem, UT (US); Michael D. Wright, Sandy, UT (US); Merrill Kay Smith, Riverton, UT (US); David O. Cox, Orem, UT (US); Kyle Bryan Seegmiller, Salt Lake City, UT (US); Jonathan Brett Wood, Spanish Fork, UT (US)

(73) Assignee: Brycen Co., Ltd., Tokyo (JP)

( * ) Notice: Subject to any disclaimer, the term of this patent is extended or adjusted under 35 U.S.C. 154(b) by 325 days.

(21) Appl. No.: 09/825,671

(22) Filed: Apr. 3, 2001

(65) Prior Publication Data

US 2002/0141336 A1 Oct. 3, 2002

(51) Int. Cl.[7] .............................. H04J 1/16; H04J 3/14
(52) U.S. Cl. ................. 370/235; 709/229; 370/230; 370/231; 370/229
(58) Field of Search .............. 370/229–31, 235, 370/469; 709/232, 237, 320, 328, 229; 455/418, 455

(56) References Cited

U.S. PATENT DOCUMENTS

| | | | | | |
|---|---|---|---|---|---|
| 5,920,703 A | * | 7/1999 | Campbell et al. | ........... | 709/236 |
| 5,951,647 A | * | 9/1999 | Beah et al. | ................. | 709/232 |
| 6,452,910 B1 | * | 9/2002 | Vij et al. | ..................... | 370/310 |
| 2001/0029166 A1 | * | 10/2001 | Rune et al. | ..................... | 455/41 |
| 2002/0145980 A1 | * | 10/2002 | Morley et al. | .............. | 370/244 |
| 2002/0159406 A1 | * | 10/2002 | Fukuda | ........................ | 370/328 |

FOREIGN PATENT DOCUMENTS

WO          0117155          3/2001

* cited by examiner

Primary Examiner—Melvin Marcelo
Assistant Examiner—Ronld Abelson
(74) Attorney, Agent, or Firm—Sawyer Law Group LLP

(57) ABSTRACT

The present invention provides a method and system for controlling packet flow through a protocol stack. The method includes: receiving a packet by a layer manager, wherein the layer manager may interface with each layer of the protocol stack; determining a service associated with the packet by the layer manager; accessing a list of layers of the protocol stack for the service by the layer manager; and routing the packet to a layer of the protocol stack according to the list. The layer manager comprises a plurality of protocol descriptor lists for supported services and uses these lists to route a packet to the appropriate stack layer. In this manner, the stack layers need not have knowledge of the other layers or of the proper routing of the packet. This makes the implementation of the layers in the protocol stack easier.

3 Claims, 3 Drawing Sheets

CONTROLLING PACKET FLOW THROUGH A STACK USING SERVICE RECORDS

FIELD OF THE INVENTION

The present invention relates to protocol stacks, and more particularly to packet flow control through the protocol stack.

BACKGROUND OF THE INVENTION

The Bluetooth™ networking protocol is well known in the art. FIG. 1 illustrates a standard Bluetooth protocol stack. The stack 100 includes a Host Controller Interface (HCI) layer 106, a Logical Link Control and Adaptation Protocol (L2CAP) layer 108, a Telephony Control Protocol Specification (TCS) layer 110, a Service Discovery Protocol (SDP) layer 112, and a RFCOMM protocol layer 114.

The HCI layer 106 provides a command interface which accepts communications over the physical bus (not shown). The L2CAP layer 108 supports higher level protocol multiplexing, packet segmentation and reassembly, and the conveying of quality of service information.

The TCS layer 110 provides call control and signaling of voice channels. The RFCOMM protocol layer 114 provides emulation of serial ports over the L2CAP layer 108.

The SDP layer 112 provides a means for applications to discover which services are provided by or available through a device. A Bluetooth device may act as an SDP client querying services, an SDP server providing services, or both. Each service registers with the SDP server, and information concerning each service is cataloged in service records. Through the SDP layer 112, a client may send a request to the SDP server to ask what services a remote device provides. The SDP server responds with service records of the services provided by the remote device. Part of each service record is a protocol descriptor list (PDL). The PDL comprises a list of layers of the protocol stack 100 through which to route a packet for the particular service.

However, to properly route packets through the stack 100, each stack layer 106–114 requires intimate knowledge of the stack layer "above" and "below" it in the protocol stack 100. Thus, when a packet is for a particular service provided either by a server or a client, each stack layer 106–114 must have a complete set of information on how to route the packet for this service. In effect, each stack layer 106–114 requires point to point information from a client application, through each layer of the stack 100, to a remote device. How a connection to the layer above or below is created and how the packet routed to it varies from layer to layer. This leads to considerable complexity in the protocol stack 100.

Accordingly, there exists a need for an improved method and system for controlling packet flow through a protocol stack. The present invention addresses such a need.

SUMMARY OF THE INVENTION

The present invention provides a method and system for controlling packet flow through a protocol stack. The method includes: receiving a packet by a layer manager, wherein the layer manager may interface with each layer of the protocol stack; determining a service associated with the packet by the layer manager; accessing a list of layers of the protocol stack for the service by the layer manager; and routing the packet to a layer of the protocol stack according to the list. The layer manager comprises a plurality of protocol descriptor lists for supported services and uses these lists to route a packet to the appropriate stack layer. In this manner, the stack layers need not have knowledge of the other layers or of the proper routing of the packet. This makes the implementation of the layers in the protocol stack easier.

DETAILED DESCRIPTION

The present invention provides an improved method and system for controlling packet flow through a protocol stack. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 and 3 in conjunction with the discussion below.

Figure 1:
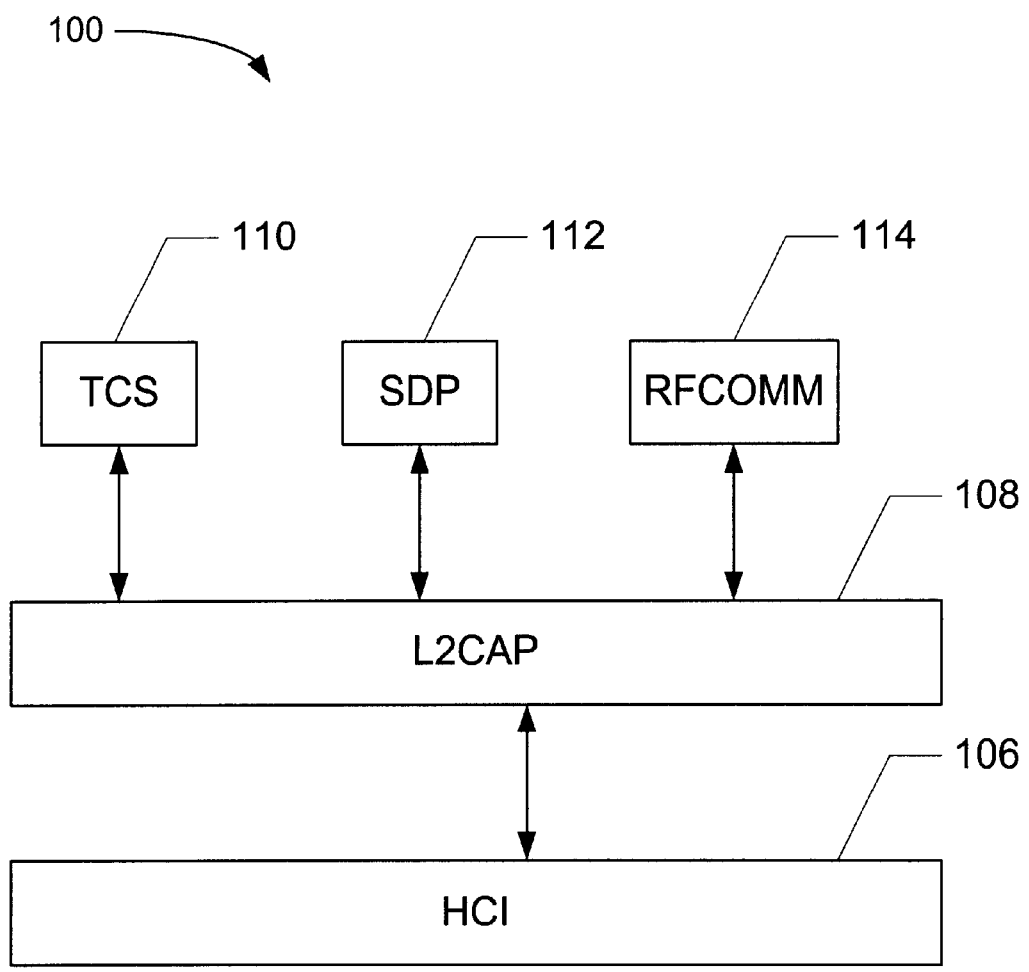
FIG. 1 illustrates a standard Bluetooth protocol stack.
Figure 2:
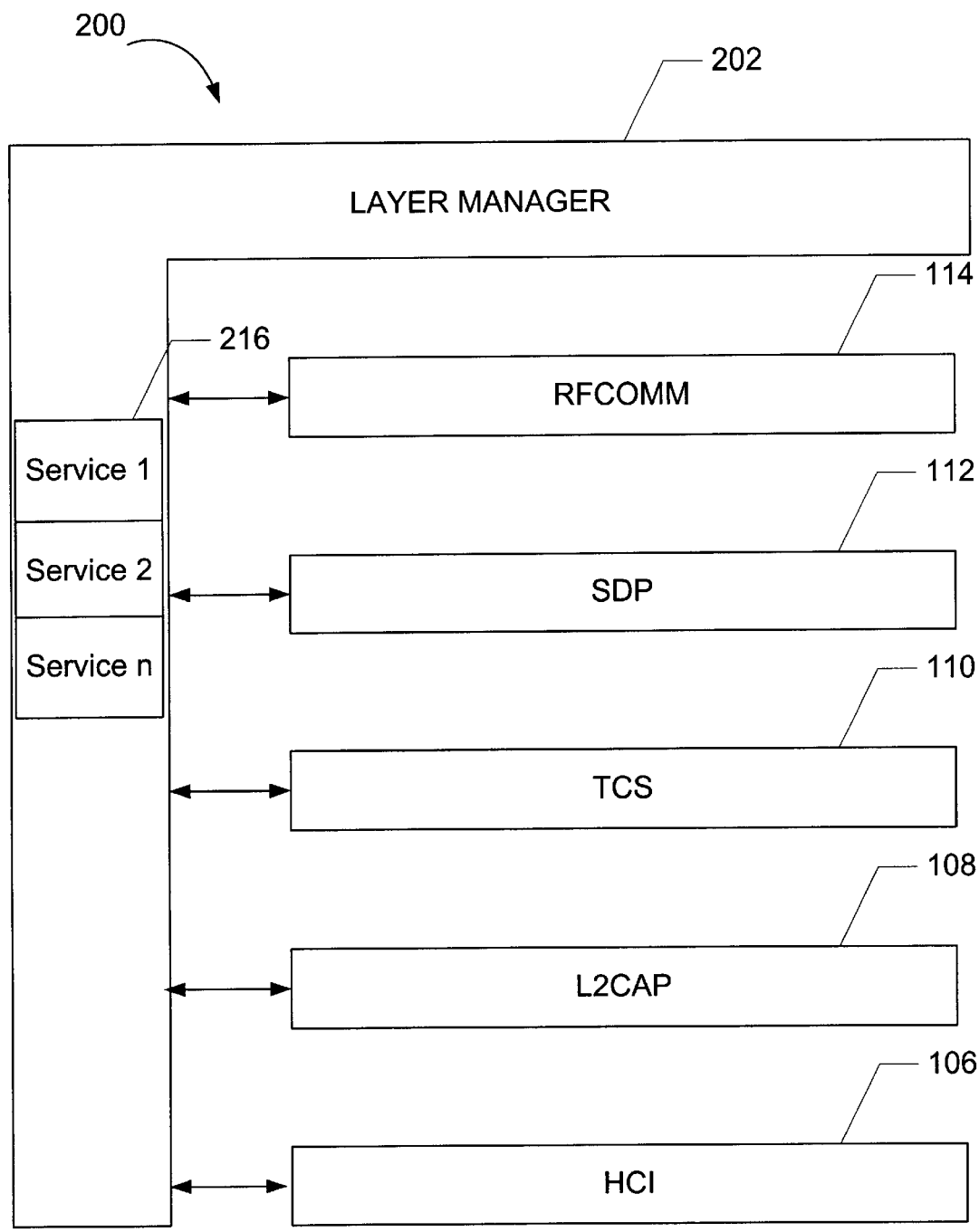
FIG. 2 illustrates a preferred embodiment of a protocol stack which controls packet flow through the protocol stack in accordance with the present invention.

FIG. 2 illustrates a preferred embodiment of a protocol stack which controls packet flow through the protocol stack in accordance with the present invention. The protocol stack 200, in addition to the stack layers 106–114 described in conjunction with FIG. 1, comprises a Layer Manager 202 which interfaces with each stack layer 106–114. The Layer Manager 202 handles the packet flow to the stack layers 106–114. The Layer Manager 202 allows each stack layer 106–114 to process the packet without the need to have knowledge of which stack layers reside directly "above" and "below" them. Each stack layer concerns itself only with whether the packet is to travel "up" or "down" the stack 200. Each stack layer receives its packet from the Layer Manager 202, and when it is done processing the packet, it gives the packet back to the Layer Manager 202. The Layer Manager 202 then routes the packet to the next stack layer.

The Layer Manager 202 comprises a plurality of protocol descriptor lists (PDL) 216. In the preferred embodiment, when a service is registered with the SDP server, as described above, the SDP server notifies the Layer Manager 202 and provides a copy of the PDL for that service. Also, the Layer Manager 202 contains a set of predefined PDL's for services provided by the clients. For example, for the RFCOMM service, the list is the HCI layer 106, the L2CAP layer 108, and the RFCOMM layer 114. If the packet is traveling up the stack 200, then the order is the HCI layer 106, the L2CAP layer 108, and the RFCOMM layer 114. If the packet is traveling down the stack 200, then the order is the RFCOMM layer 114, the L2CAP layer 108, and then the HCI layer 106. By using the PDL for a particular service, the Layer Manager 202 knows to which layers of the stack 200 the packet should be routed.

Although the present invention is described with the Layer Manager receiving the PDL's in the above manner, other methods of obtaining the PDL can be used without departing from the spirit and scope of the present invention.

Figure 3:
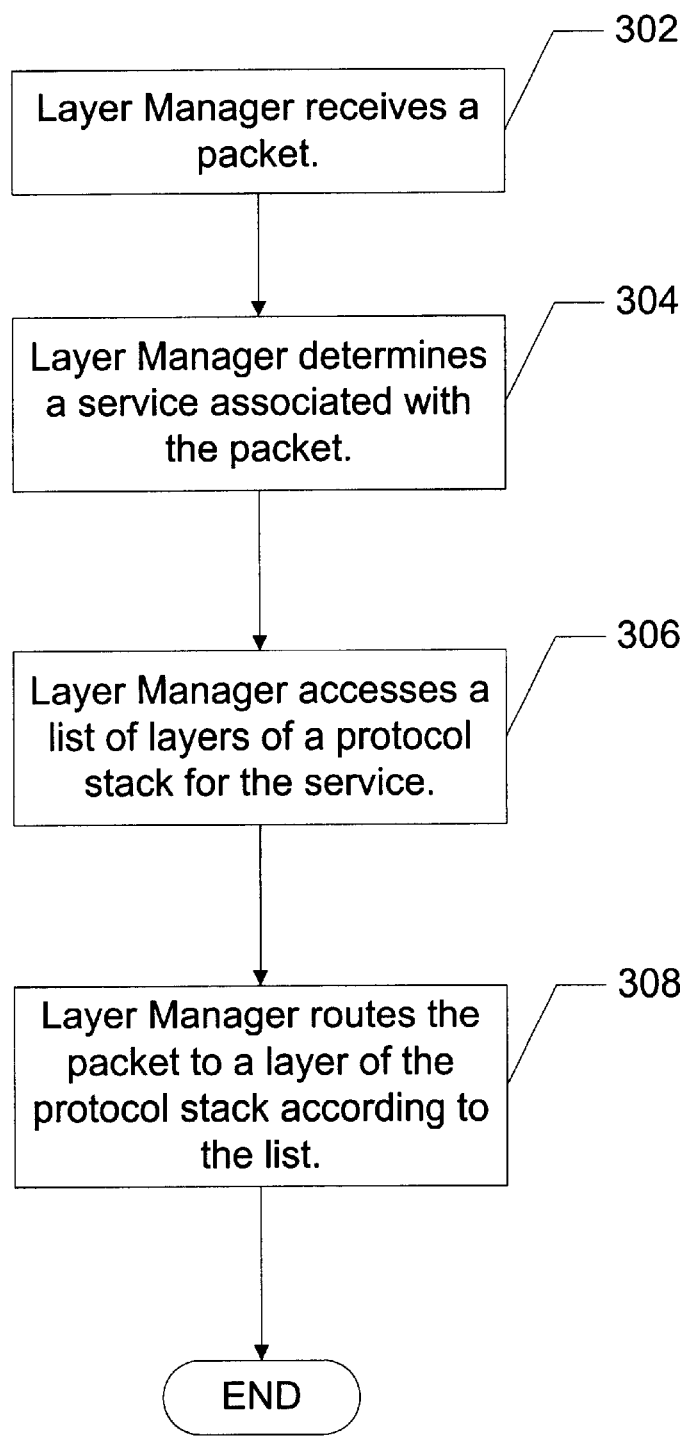
FIG. 3 is a flowchart illustrating a preferred embodiment of a method for controlling packet flow through the protocol stack in accordance with the present invention.

FIG. 3 is a flowchart illustrating a preferred embodiment of a method for controlling packet flow through the protocol stack in accordance with the present invention. First, the Layer Manager 202 receives a packet, via step 302. Next, the Layer Manager 202 determines a service associated with the packet, via step 304. In the preferred embodiment, this determination is based on the protocol/service multiplexer (PSM) field. The PSM is 16-bit field occurring after the header in the packet which indicates the upper-level protocol the packet originated from. The PSM field references the PDL to be used for the packet. The Layer Manager 202 accesses the PDL 216 for the service, via step 306. The PDL comprises a list of layers of the protocol stack 200 for the service. Then, the Layer Manager 202 routes the packet to a layer of the protocol stack 200 according to the list, via step 308.

For example, assume a packet is to be sent up through the stack 200 for the RFCOMM service. The packet is received by the Layer Manager 202, via step 302. Through the packet's PSM field, the Layer Manager 202 determines that the RFCOMM service is associated with the packet, via step 304. The Layer Manager 202 then accesses a PDL for the RFCOMM service, via step 306. The RFCOMM service's PDL includes the HCI layer 106, the L2CAP layer 108, and the RFCOMM layer 114. The Layer Manager 202 then routes the packet to the HCI layer 106, via step 308. The HCI layer 106 processes the packet and returns it to the Layer Manager 202.

The Layer Manager 202 receives the packet from the HCI layer 106, via step 302. Again, through the packet's PSM field, it determines that the RFCOMM service is associated with the packet, via step 304, and accesses the PDL for the RFCOMM service, via step 306. The Layer Manager 202 knows that the packet was received from the HCI layer 106, and thus routes it to the next layer on the PDL, the L2CAP layer 108, via step 308. The L2CAP layer 108 process the packet and returns it to the Layer Manager 202.

The Layer Manager 202 receives the packet from the L2CAP layer 108, via step 302. It determines that the RFCOMM service is associated with the packet, via step 304, and accesses the PDL for the RFCOMM service, via step 306. The Layer Manager 202 knows that the packet was received from the L2CAP layer 108, and thus routes it to the next layer on the PDL, the RFCOMM layer 112, via step 308.

In this manner, each stack layer 106–114 communicates with the Layer Manager 202 and not with each other. The stack layers 106–114 thus need not have knowledge of the other layers or of the proper routing of the packet. This makes the implementation of the layers 106–114 in the protocol stack 200 easier.

Although the present invention is described in the context of the Bluetooth protocol stack, it may be applied to the packet routing through other protocol stacks without departing from the spirit and scope of the present invention.

An improved method and system for controlling packet flow through a protocol stack has been disclosed. The system comprises a layer manager which interfaces with each stack layer. The layer manager comprises a plurality of protocol descriptor lists for supported services and uses these lists to route a packet to the appropriate stack layer. In this manner, the stack layers need not have knowledge of the other layers or of the proper routing of the packet. This makes the implementation of the layers in the protocol stack easier.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for controlling packet flow through a protocol stack, comprising the steps of:
   (a) receiving a packet by a layer manager, wherein the layer manager may interface with each layer of the protocol stack;
   (b) examining a protocol/service multiplexer (PSM) field in the packet by the layer manager;
   (c) determining a protocol descriptor list (PDL) referenced by the PSM field by the layer manager, wherein the PDL comprises a list of layers of the protocol stack for the service;
   (d) accessing the PDL by the layer manager; and
   (e) routing the packet to a layer of the protocol stack according to the PDL.

2. A system, comprising
   a plurality of stack layers; and
   a layer manager, wherein the layer manager may interface with each of the plurality of stack layers, wherein the layer manager comprises a protocol descriptor list (PDL) for a service wherein the PDL comprises a list of stack layers for a service wherein the layer manager routes a packet according to the PDL, wherein the routing of the packet by the layer manager comprises the steps of:
   (a) receiving the packet by the layer manager,
   (b) examining a PSM field in the packet,
   (c) determining the PDL referenced by the PSM field,
   (d) accessing the PDL, and
   (e) routing the packet to one of the plurality of stack layers according to the PDL.

3. A computer readable medium with program instructions for controlling packet flow through a protocol stack, comprising the instructions for:
   (a) receiving a packet by a layer manager, wherein the layer manager may interface with each layer of the protocol stack;
   (b) examining a value for a protocol/service multiplexer (PSM) field in the packet by the layer manager;
   (c) determining a protocol descriptor list (PDL) referenced by the PSM field by the layer manager, wherein the PDL comprises a list of layers of the protocol stack for the service;
   (d) accessing the PDL by the layer manager; and
   (e) routing the packet to a layer of the protocol stack according to the PDL.

* * * * *